(12) United States Patent
Chin et al.

(10) Patent No.: US 6,314,110 B1
(45) Date of Patent: Nov. 6, 2001

(54) METHOD AND APPARATUS FOR DISTRIBUTED BANDWIDTH ALLOCATION FOR A BI-DIRECTIONAL RING MEDIA WITH SPATIAL AND LOCAL REUSE

(75) Inventors: Hon Wah Chin, Palo Alto; David J. Tsiang, Menlo Park; Anthony J. Bates, Redwood City; Robert M. Broberg, San Francisco; Bruce A. Wilford, Los Altos, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/036,539

(22) Filed: Mar. 6, 1998

(51) Int. Cl.[7] .................................................. H04J 3/16
(52) U.S. Cl. ......................... 370/468; 370/404; 370/358
(58) Field of Search ................................... 370/329, 341, 370/381, 376, 358, 377, 395, 400, 468, 222, 229, 235, 253, 258, 404, 460, 543

(56) References Cited

U.S. PATENT DOCUMENTS

| | | | |
|---|---|---|---|
| 5,467,352 | 11/1995 | Cidon et al. ........................ | 370/452 |
| 5,490,145 | 2/1996 | Tanabe et al. ...................... | 370/452 |
| 5,526,356 | 6/1996 | Kim et al. .......................... | 370/403 |
| 5,784,569 | * 7/1998 | Miller et al. ....................... | 709/235 |
| 5,901,148 | * 5/1999 | Bowen et al. ...................... | 370/452 |
| 5,953,338 | * 9/1999 | Ma et al. ........................... | 370/395 |
| 6,031,845 | * 2/2000 | Walding ............................. | 370/468 |

OTHER PUBLICATIONS

Cidon et al., "Improved Fairness Algorithms For Rings with Spatial Reuse", 1997, IEEE.

Cidon et al., "MetaRing—A Full–Duplex Ring with Fairness and Spatial Reuse", Transactions on Communications, vol. 41, No. 1, Jan. 1993, IEEE.

Sebring Systems, "Commuting on An Information Superhighway A Metaphorical Introduction to the Sebring Ring™", IEEE 802.6.

\* cited by examiner

Primary Examiner—Wellington Chin
Assistant Examiner—Brenda Pham
(74) Attorney, Agent, or Firm—Van Pelt & Yi LLP

(57) ABSTRACT

A system and method for locally determining a fair allocated bandwidth for a network node configured to send and receive packets in an upstream direction and a downstream direction is disclosed. A local allocated bandwidth is allocated for locally generated network packets sent in the downstream direction. A minimum downstream available network bandwidth is determined from information received in the upstream direction. The local allocated bandwidth is adjusted based on the minimum downstream available network bandwidth and the local allocated bandwidth is used to govern whether a class of locally generated network packets are sent in the downstream direction.

32 Claims, 7 Drawing Sheets

METHOD AND APPARATUS FOR DISTRIBUTED BANDWIDTH ALLOCATION FOR A BI-DIRECTIONAL RING MEDIA WITH SPATIAL AND LOCAL REUSE

FIELD OF THE INVENTION

The present invention relates generally to methods and apparatuses for allocating bandwidth to nodes in a bi-directional ring network. More specifically, the invention relates to a method and apparatus for implementing spatial and local reuse as well as fairness in a bi-directional ring network which may extend over a large distance even when a significant communication time delay may exist between nodes of the network.

DESCRIPTION OF THE RELATED ART

In the past, multi-node communication systems, such as local area networks, have implemented ring topologies that require some type of management scheme for managing node access to the ring. Ring networks such as FDDI networks or Token Ring networks use a single token circulating around the ring to grant access to the ring medium by the various nodes on the ring. This allows orderly access to the medium; however, the use of one token means that only one node may transmit onto the ring at any given time and requires methods for ensuring the presence of one and only one token on the ring.

In an extended high speed ring, if only one packet is being transmitted on the ring, portions of the ring will be idle. In order for the full bandwidth of the ring to be utilized, it is desirable that any node access management scheme implemented on the ring allow for both spatial and local reuse. Ring networks such as FDDI and Token Ring which use a single token to grant access to the ring medium provide for orderly access to the ring do not allow either spatial reuse or local reuse, although in some cases, it is possible to have spatial reuse by allowing the circulation of multiple tokens. Also, the reconfiguration required when nodes are inserted or removed from the ring will cause the entire ring to stop operation until the presence of exactly one token on the ring is assured.

Spatial reuse means that nodes in sections of the ring on which packets are being forwarded may also transmit their own packets onto the ring while they are forwarding packets so long as there is sufficient bandwidth. Local reuse means that nodes in a local section of the ring where there is not congestion may use the ring for local traffic even though congestion may exist in another section of the ring.

FIG. 1 is a block diagram illustrating a ring 100 with six nodes for the purpose of demonstrating spatial and local reuse. Ring 100 includes nodes 101, 102, 103, 104, 105, and 106. Links 111, 112, 113, 114, 115, and 116 connect the various nodes.

If, when packets are being transmitted from node 101 to node 104 node 105 can also simultaneously transmit packets to node 106, then the ring allows spatial reuse. Different parts of the ring "space" are used simultaneously. Once spatial reuse in a ring is allowed, the amount of throughput available to the nodes will vary depending on the traffic patterns. If node 101 sends to node 102, and node 103 sends to node 104, the total throughput would be twice the basic bandwidth of the links. If node 101 sends to node 104, then node 102 sends to node 103, the total throughput available is only the basic bandwidth of the link 112. There is congestion at this link, with potential "starvation" of node 102.

Resolving the contention for this resource is the object of ring quota schemes. Such schemes generally limit the transmission from node 101 so that node 102 has some bandwidth available on link 112 left for its traffic after forwarding the traffic from node 101. Typically, a ring quota scheme would limit the transmission from "upstream" nodes to one half the basic bandwidth. Local reuse would allow node 106 in this situation to send to node 101 at the full link bandwidth in spite of the one half constraint elsewhere in the ring.

Various quota schemes for managing node access to a ring network have been developed which allow for spatial and local reuse of the ring. One such scheme is described in U.S. Pat. No. 5,467,352, issued to Cidon, et al. on Nov. 14, 1995. "METHOD AND APPARATUS FOR IMPROVED THROUGHPUT IN A MULTI-NODE COMMUNICATION SYSTEM WITH A SHARED RESOURCE" (hereinafter the '352 patent), which is incorporated herein by reference for all purposes. The '352 patent describes a quota allocation system which allocates to each node a certain quota of bandwidth which that node is allowed to use for transmitting information onto the ring. Since each node may transmit packets up to its quota at any given time, nodes may simultaneously put packets on the ring and therefore spatial reuse is achieved.

In addition, a scheme for allowing a non-quota traffic on the network is disclosed. Nodes which are "satisfied", that is, nodes that have either no quota remaining to transmit packets or no more packets to transmit notify other nodes of the fact that they are "satisfied." Other nodes are allowed to send non-quota traffic through the "satisfied" nodes. This scheme provides some flexibility since there is both quota and non-quota access to the ring network. Non-quota access frees up bandwidth on the ring that is assigned to a node as part of its quota but which is not being used by the node.

Although the quota scheme with additional non-quota access enables some spatial and local reuse of the ring, such a scheme does not optimally allocate all of the ring bandwidth to nodes that wish to transmit as quickly as is desired in some cases. Specifically, in a very large network where signals take a long time to travel between nodes, the performance of such a scheme may not be satisfactory because nodes would have to wait for signals to circulate entirely around the ring. Sometimes twice that time would be required for the bandwidth request to circulate and that bandwidth grant to be returned. Furthermore, it would be desirable if the quota assigned to each node that wishes to transmit could be determined based on the amount of traffic on the network at the time when the various nodes need to transmit instead of on an a priori basis in the form of a preassigned quota. What is needed is a bandwidth allocation scheme that would allow spatial and local reuse of the ring media and that would more quickly and flexibly allocate the ring bandwidth among nodes that wish to transmit so that bandwidth is not wasted.

In addition, it is important in many networks that preference be given to high priority traffic such as audio traffic which requires a certain amount of consistently available bandwidth so that an audio or video transmission is able to continuously stream between nodes without interruption. Therefore, what is also needed is a bandwidth allocation scheme that can insure that a certain amount of bandwidth is reserved for high priority communication between network nodes. Finally, it would be desirable if the distributed bandwidth allocation scheme could use a minimal amount of processing overhead in making the calculations necessary to determine how much bandwidth each node should be allocated and a minimal amount of network bandwidth to send any required control messages on the ring network.

SUMMARY OF THE INVENTION

Accordingly, a bandwidth allocation scheme is disclosed that allows the bandwidth of the ring to be statistically multiplexed among the nodes on the ring. No a priori bandwidth allocation scheme is necessary, since each node senses the amount of traffic that it is forwarding, reports to other nodes the amount of bandwidth that it is receiving when necessary, and adjusts its own bandwidth based on received reports from other nodes. In addition, no ring master needs to be designated or negotiated. The bandwidth allocation on the ring is therefore adapted to the distribution of traffic that is on the ring at any given time. This adaptability is described as statistical multiplexing.

A management scheme is provided for allowing nodes on a bi-directional ring network to access the ring network in a fair manner without an a priori assignment of a quota to each node. Each node determines independently how much of the ring bandwidth it should use for transmitting its own data. Each node makes its determination based on traffic received and reports of available bandwidth sent to it from other nodes on the ring network. In one embodiment implemented on a bi-directional ring, reports of available bandwidth at other nodes are sent "upstream" in the direction opposite from the "downstream" direction that data is traveling. Network nodes evaluate how much of the network bandwidth is available to it for transmitting data and then send a message to other nodes on the network, notifying them how much bandwidth is available. Each node evaluates the amount of bandwidth that it is using compared to the minimum bandwidth that is available to other nodes on the network based on the notifications it receives. If a node is using an unfairly large amount of bandwidth, then it decreases its usage until a fair result is reached.

In one embodiment, the allocated bandwidth for a node that is using too much bandwidth is decreased toward the minimum available downstream bandwidth until that node is using the same amount of bandwidth as downstream nodes. In addition, when a node determines that it is not using more than the minimum bandwidth available to other nodes, that node automatically increases the bandwidth that it allocates to itself. Also, nodes determine whether or not to forward messages from other nodes indicating the minimum bandwidth they have available based on a comparison of the amount of traffic that the node is forwarding and the amount of traffic that the node is sourcing, which is also referred to as local transmit usage. In one embodiment, local transmit usage is determined by incrementing an accumulator whenever local packets are transmitted and periodically reducing the accumulator by a fraction of sourcing its total. Messages indicating that a low amount of bandwidth is available on a certain congested portion of the network are thus not forwarded upstream beyond the node that is contributing to the congestion.

In one embodiment, a method of locally determining a fair allocated bandwidth for a network node configured to send and receive packets in an upstream direction and a downstream is disclosed. The method includes allocating a local allocated bandwidth for locally generated network packets sent in the downstream direction and determining from information received in the upstream direction a minimum downstream available network bandwidth. The local allocated bandwidth is adjusted based on the minimum downstream available network bandwidth and the local allocated bandwidth is used to govern whether a class of locally generated network packets are sent in the downstream direction.

Thus, a scheme is disclosed which allows spatial and local reuse of the ring network. The amount of bandwidth allocated to each node is continually adjusted according to the bandwidth demands of the other nodes in the a network. The bandwidth allocation scheme also provides for local reuse because messages sent from nodes which need more bandwidth are not forwarded to portions of the ring network which are not contributing to the congestion experienced by the nodes that are not getting enough bandwidth.

It should be appreciated that the present invention can be implemented in numerous ways, including as a process, an apparatus, a system, a device, a method, or a computer readable medium. Several inventive embodiments of the present invention are described below.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
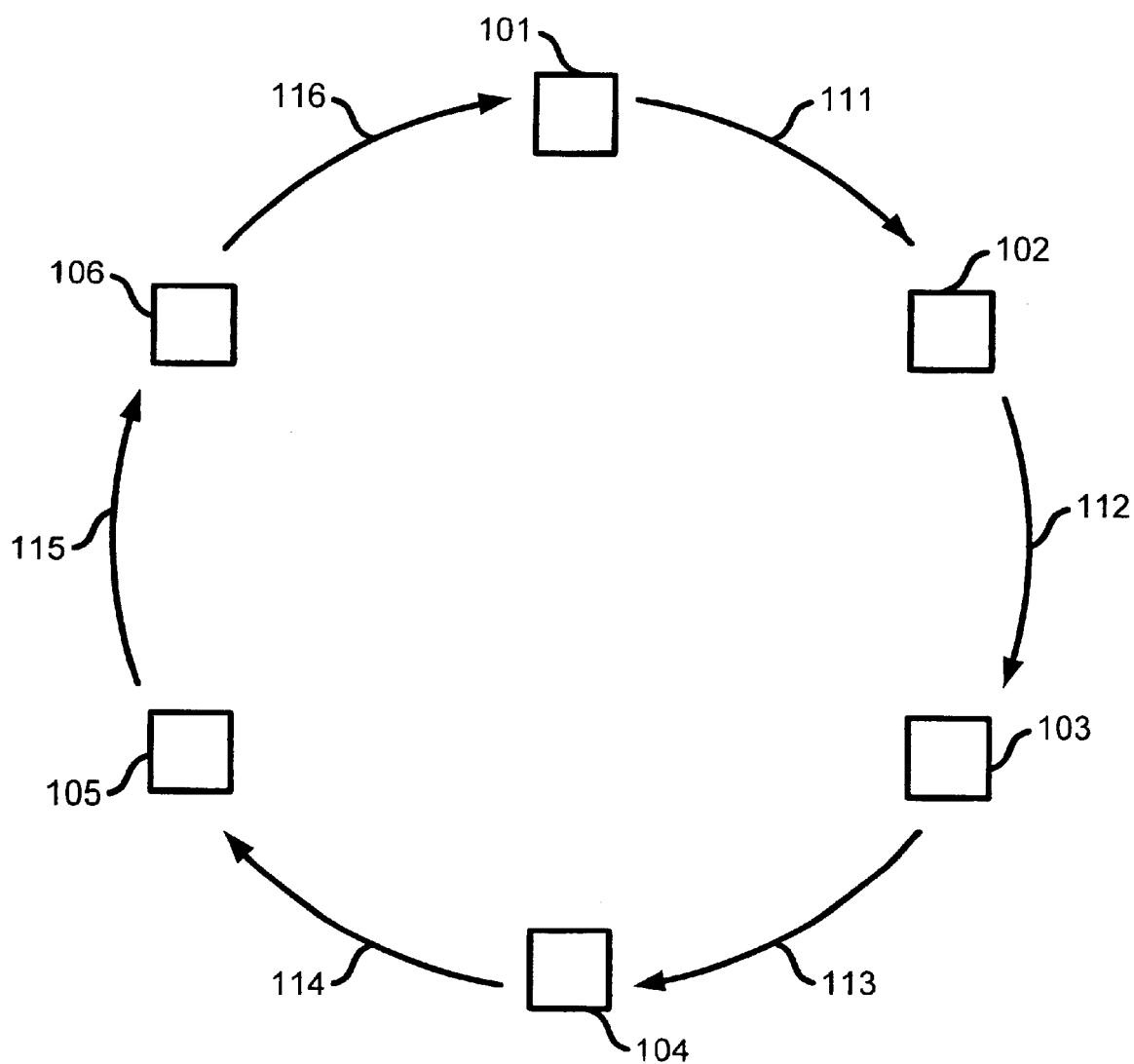
FIG. 1 is a block diagram illustrating a ring with six nodes for the purpose of demonstrating spatial and local reuse.
Figure 2:
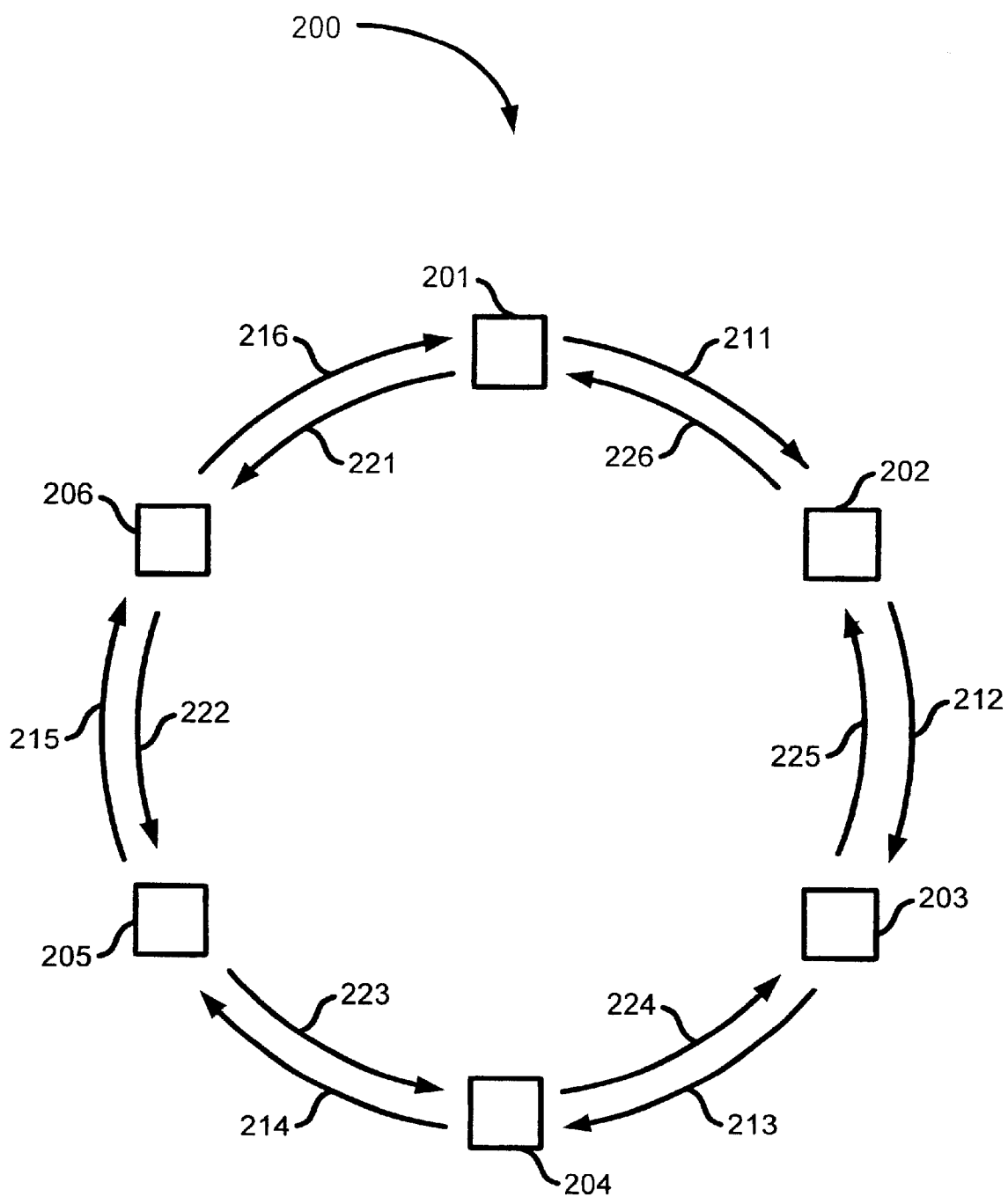
FIG. 2 is a schematic diagram illustrating a bi-directional ring network on which a distributed bandwidth allocation scheme that allows for spatial and local reuse is implemented.

FIG. 2 is a schematic diagram illustrating a bi-directional ring network on which a distributed bandwidth allocation scheme that allows for spatial and local reuse is implemented. This scheme is also referred to as the spatial reuse protocol. The spatial reuse protocol is preferably implemented on a bi-directional ring as shown. In certain embodiments, aspects of the spatial reuse protocol may also be implemented on a unidirectional ring. Bi-directional ring 200 includes nodes 201, 202, 203, 204, 205, and 206. The nodes are connected by two rings. The outer ring includes links 211, 212, 213, 214, 215, and 216. The links on the outer ring send packets around the ring in a clockwise direction. The inner ring includes links 221, 222, 223, 224, 225, and 226. The links in the inner ring send packets around the ring in a counterclockwise direction.

Two types of information are sent on the rings, data and control information. Preferably, as data is sent downstream in a clockwise direction by the outer ring, control information for managing the data traffic on the outer ring is sent upstream or counterclockwise on the inner ring. Likewise, as data packets are sent downstream in a counter clockwise direction on the inner ring, control information for management traffic on the inner ring are sent upstream or clockwise on the outer ring. Thus, each ring uses the other to send control information in a direction that is opposite to the direction that data packets are traveling.

In one embodiment, separate control packets are not generated for the control information. Instead, control information for the other ring is piggybacked in each data packet as part of a packet header. If no data packets are being sent on one ring, then a special empty packet is generated so that control information is sent upstream for the other ring. Separate control packets may also be generated. For purposes of this discussion, whenever a control packet is referred to, it should be understood that a special control packet or part of a data packet, such as a space reserved in a data packet header could also be used. Control information is carried upstream to nodes about the bandwidth that is available to other nodes downstream. As is described below, this information is used by each node to allocate to itself a fair amount of bandwidth for transmitting locally generated messages. In this context, a fair amount of bandwidth does not necessarily mean an exactly equal amount of bandwidth to other nodes, although it will be close to equal. The bandwidth is fairly determined by each node.

Each node implements the spatial reuse protocol by determining a fair amount of allocated bandwidth based on the bandwidth available to downstream nodes. Also, each node determines when control information should be sent upstream indicating that the node or nodes downstream are not receiving enough bandwidth. This is done by keeping track of four quantities: local transmit usage, downstream usage, allocated usage, and forward rate.

Local transmit usage is a measure of how much network bandwidth a node is using to transmit its own locally generated packets. Local transmit usage is measured a number of different ways in different embodiments, including as a running sum or a moving average. In one embodiment, local transmit usage is measured by incrementing an accumulator every time a packet is transmitted onto the network by a node. Preferably, the accumulator accumulates the number of bytes in each packet or else a scaled version of the number of bytes, that is, the number of bytes divided by a scaling factor to keep the numbers in a smaller range. In certain alternative embodiments, a counter that simply counts the number of packets is used. Periodically, the accumulator is decreased by reducing the accumulator by a fraction of the total count. This is efficiently done by simply taking the binary value of the accumulator, shifting it a number of bits and subtracting the bit shifted count from the original count. This is a particularly desirable way of decreasing the accumulator because of its simplicity. For example, in one embodiment, the original count is shifted 2 bits and the bit shifted count is one fourth of the original count so that when the bit shifted count is subtracted, three fourths of the original count remain. In another embodiment, the original count is shifted by three bits and subtracted. Since shifting the count three bits yields a value that is one eighth of the original count, this procedure results in reducing the count by one eighth.

Thus, the local transmit usage accumulator is exponentially decaying over time while simultaneously being incremented by any local use of the network for transmitting data. Similarly, a forward rate is calculated based on the amount of data that the node is required to forward to the next node in the ring network. Just as with local transmit usage, the forward rate is calculated a number of different way in different embodiments. A similar exponential decay and accumulator incrementing scheme to the one used to determine local transmit usage is preferred. Each time data is forwarded by the node, an accumulator representing the forward rate is incremented. Periodically, that accumulator is reduced by a fraction of the accumulator total.

Allocated usage is a quantity that is calculated by the node to determine how much bandwidth it should use for transmitting its own information. Allocated usage is allowed to grow over time towards a maximum allocated usage unless a message is received from a downstream node indicating that the allocated usage should be reduced so that the downstream node will have more bandwidth available to it. In one embodiment, allocated usage is periodically increased and also decreased whenever a message is received indicating that downstream available usage is less than the current allocated usage. When no downstream usage information is received, then allocated usage is increased periodically according to the following formula:

$$\text{Allocated usage} = \text{Allocated usage} + \frac{\text{Maximum usage} - \text{Allocated usage}}{\text{Growth Coefficient}}$$

Allocated usage is increased by a fraction of the difference between the maximum allowable usage and the current allocated usage. The fraction is determined by a growth coefficient which, along with the frequency of updating the allocated usage, determines how quickly allocated usage increases to maximum usage when no report of lower downstream available bandwidth available is received. The updating frequency and growth coefficient may be tuned in any given system to optimize performance based on the nature of the network traffic experienced. Increasing the growth coefficient causes the allocated usage to grow more slowly. It should be noted that the maximum usage may either be the maximum available bandwidth on the network or may also be some amount of bandwidth less than the total available bandwidth so that some network bandwidth is reserved for priority traffic. In addition, in one embodiment, the allocated usage is clipped at a value slightly less than the maximum usage.

When information is received about the downstream available bandwidth, then the allocated usage is averaged with the amount of bandwidth available downstream and then increased. In one embodiment this is done according to the following equation:

$$\text{Allocated usage} = \frac{\text{Allocated usage} + \text{Downstream bandwidth}}{2} + \frac{\text{Maximum usage} - \text{Allocated usage}}{\text{Growth Coefficient}}$$

Thus the allocated usage is averaged with the downstream available bandwidth. This amount is then increased toward maximum usage. In one embodiment, the rate of increase controlled by the growth coefficient is selected to be less than the rate of increase when no downstream bandwidth information is available.

It should be noted that in different embodiments, many different equations are used to increase allocated usage upward towards maximum usage and decrease allocated usage downwards towards the available downstream bandwidth. The two equations shown above have the advantage of being relatively simple to implement in hardware while also effectively increasing allocated usage when no downstream bandwidth limiting information is received and decreasing the allocated usage towards the downstream bandwidth available when downstream bandwidth is lower than allocated usage. It should be noted that downstream bandwidth is used to decrease allocated usage only when control information has been received indicating that downstream bandwidth is lower than allocated usage within a certain period of time. That period of time may be adjusted to tune the network according to the nature of the traffic on the network.

The description above shows how each node determines a fair amount of allocated usage for the node. When downstream nodes have limited bandwidth available for transmitting data, a message is sent upstream indicating the amount of bandwidth available to the downstream nodes. Each node evaluates control information received from downstream nodes and decreases its allocated usage if it has allocated more bandwidth to itself than downstream nodes are currently receiving. Before describing how each node uses the allocated bandwidth to determine whether or not to send data, it will be useful to consider an example of how network bandwidth is shared in a fair and efficient manner with spatial and local reuse when the nodes implement the spatial reuse protocol described above.

Returning to FIG. 2, consider a case where node 202 is transmitting to node 204 using links 212 and 213 on the outer ring. If no information received by node 202 indicating downstream available bandwidth, the allocated usage for node 202 increases until it reaches the maximum allowed allocated usage. Thus, links 212 and 213 become completely devoted to carrying data transmitted by node 202. If node 203 needs to transmit to node 204, it immediately notices that it is forwarding data at a rate that prevents it from transmitting any of its own data onto the network. It has a very low local transmit usage and since its local transmit usage is less than its forward rate, it sends information upstream to node 202 indicating the available bandwidth for node 203. When node 202 receives indication of a low downstream available bandwidth, it decreases its allocated usage and reduces amount of its own data that it is transmitting on the network. Then, node 203 is able to transmit some of its own data onto the network.

The local transmit usage for node 203 increases and the downstream available bandwidth that is indicated to node 202 increases until eventually node 202 reduces its allocated bandwidth to a fair amount that allows node 203 to transmit onto the network and share the network bandwidth with node 202. If node 203 stops transmitting, then it no longer sends information indicating its available bandwidth upstream to node 202. The allocated usage for node 202 is then allowed to increase back towards the maximum allocated usage.

The forward rate is used by each node to determine whether or not downstream available bandwidth information should be forwarded upstream. Since, as described above, downstream allocated bandwidth is used by nodes to reduce the amount of bandwidth that is allocated for transmitting locally generated data, it is desirable that downstream allocated bandwidth not be forwarded to nodes that are not contributing to congestion. This is accomplished by having nodes only forward information indicating downstream available bandwidth if the local transmit usage of the node is less than the forward rate for the node. Thus, when a node receives information indicating downstream allocated bandwidth, the node determines whether or not its local transmit usage exceeds its forward rate. If its local transmit usage exceeds the forward rate, then the traffic congestion experienced downstream is caused primarily by that node and not by upstream nodes. Therefore, the node does not forward the downstream allocated bandwidth upstream. This enables the network to efficiently achieve local reuse.

It should be noted that in one embodiment, local transmit usage is compared to the minimum downstream available network bandwidth received plus a small constant. The addition of the small constant prevents a very small minimum downstream available network bandwidth from circulating for a long period when it should be increasing.

A number of variations of the calculations described above are used in addition to or instead of the methods described for calculating the local transmit usage and forward rate. For example, in certain embodiments, instead of sending local transmit usage calculated in the manner described above upstream, a time weighted average of the local transmit usage is used. In one embodiment, the time weighted average of the local transmit usage is calculated so that the time weighted average of the local transmit usage tends to decrease more slowly than it increases. Similarly, in certain embodiments, a time weighted average of the forward rate is used in some embodiments. Also, when a quantity such as local transmit usage is decayed exponentially by periodically subtracting a fraction of the quantity, then, in some embodiments, a minimum constant is actually subtracted when the fraction of the quantity decreases below the minimum constant.

In the example described above, node 202 recognizes that its local transmit usage is greater than its forward rate and does not forward the downstream available bandwidth for node 203 to node 201. This is desirable because the cause of network congestion on link 213 is caused by the data transmitted by node 202. Thus, nodes 201, 206, 205, and 204 will not be caused to reduce their allocated bandwidth as a result of the congestion occurring between nodes 202 and 204 and local reuse is achieved. Fair spatial reuse is also achieved because in areas where congestion occurs such as link 213, allocated bandwidth is adjusted for the node that caused the congestion, in this case, node 202.

It should be noted that decisions whether or not to send information upstream indicating downstream available bandwidth is made by each node when the node has locally generated data that it needs to transmit on the network. The following description will show how each individual node determines whether it can send data on the network based on the state of its transit buffer and its allocated usage.

Figure 3:
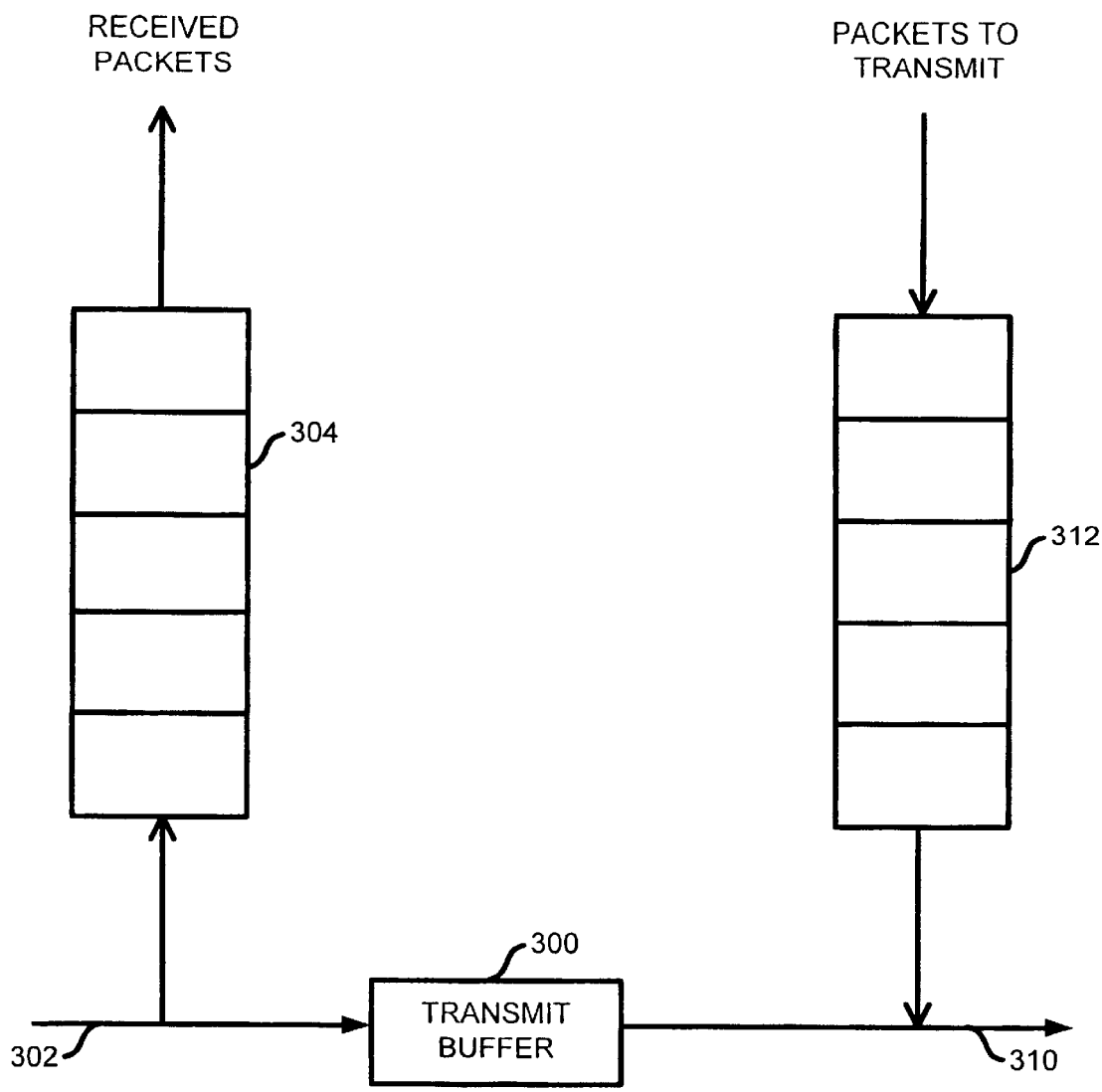
FIG. 3 is a schematic diagram illustrating how a transit buffer 300 is used by a node to forward information on the network.

FIG. 3 is a schematic diagram illustrating how a transit buffer 300 is used by a node to forward information on the network. Packets are received by the node on an input link 302 and packets which are intended for the node are sent to a received packet buffer 304. Packets which are being forwarded are added to transit buffer 300. Packets in transit buffer 300 are transmitted on output link 310 to the next downstream node. In addition to packets from transit buffer 300 that are being forwarded, the node may also transmit its own packets from a packet transmission buffer 312 onto output link 310. Before transmitting packets from packet transmission buffer 312, the node must first check to make sure that the transit buffer is not full. The amount of data in the transit buffer is sometimes referred to as the depth of the transit buffer.

Actually, the node checks whether the amount of data stored in the transit buffer is less than a certain threshold. The threshold is usually some amount below the full capacity of the transit buffer to allow for a safety factor to prevent packets from being dropped that are supposed to be forwarded. Additionally, in one embodiment, the threshold is further reduced to allow for priority data. When the node wants to transmit its own packets onto the network from the packet transmission buffer and it determines that its ability to do so is limited by packets being forwarded from upstream nodes through the transit buffer, then that node piggybacks information indicating the amount of bandwidth that is available to the node on a packet that is sent upstream. In one embodiment, space is reserved in packet headers for downstream available bandwidth information. By indicating its local transmit usage to upstream nodes that implement the spatial reuse protocol, the downstream node insures that it will eventually have available to it a fair amount of network bandwidth. The process by which a node determines whether or not to send downstream available bandwidth information upstream and whether or not to transmit its own packets when the transit buffer is below the threshold is further described below.

Figure 4:
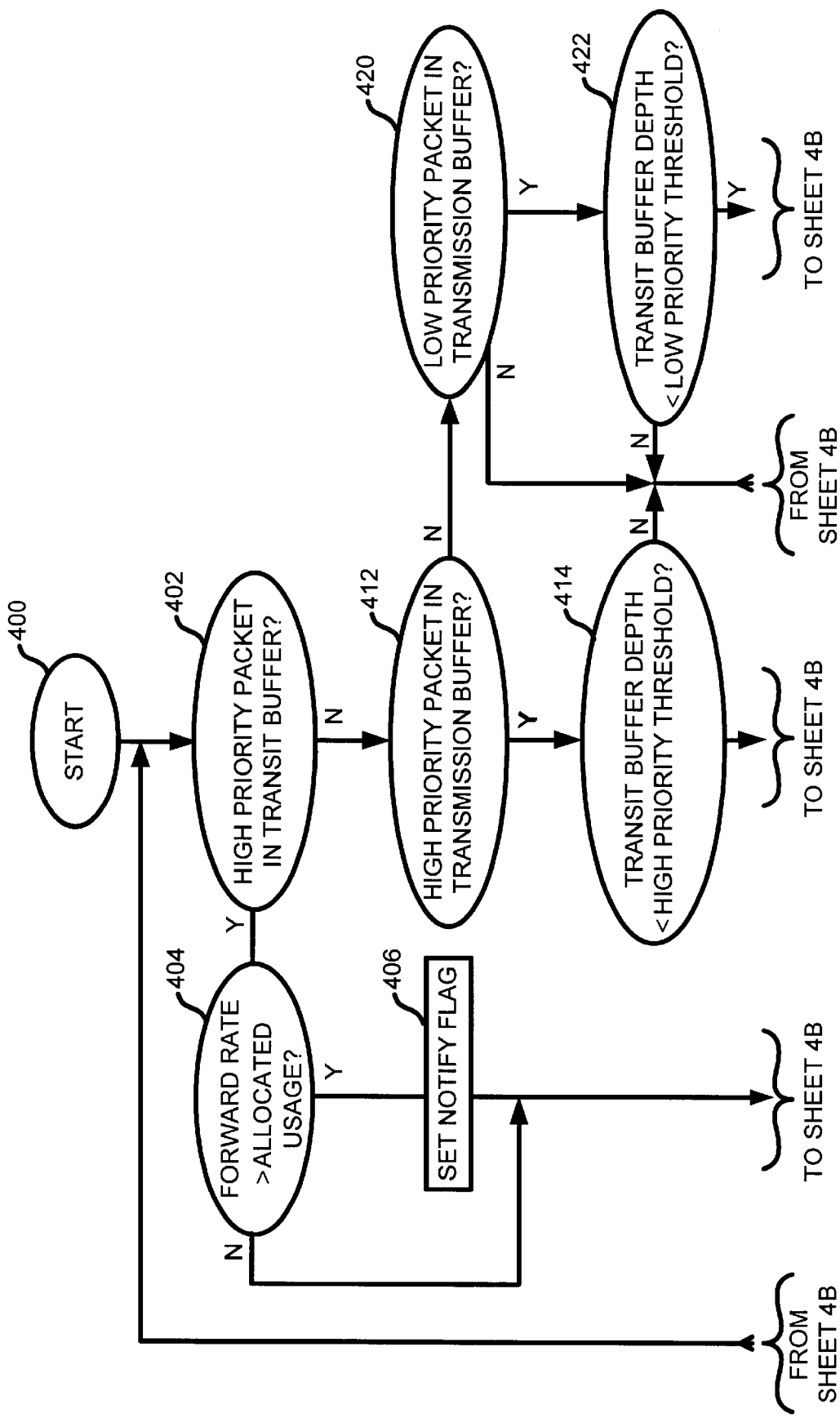
FIG. 4 is a process flow diagram illustrating a process implemented on each node for determining whether to transmit locally generated packets downstream on the network and whether to transmit downstream available bandwidth information upstream.
Figure 4:
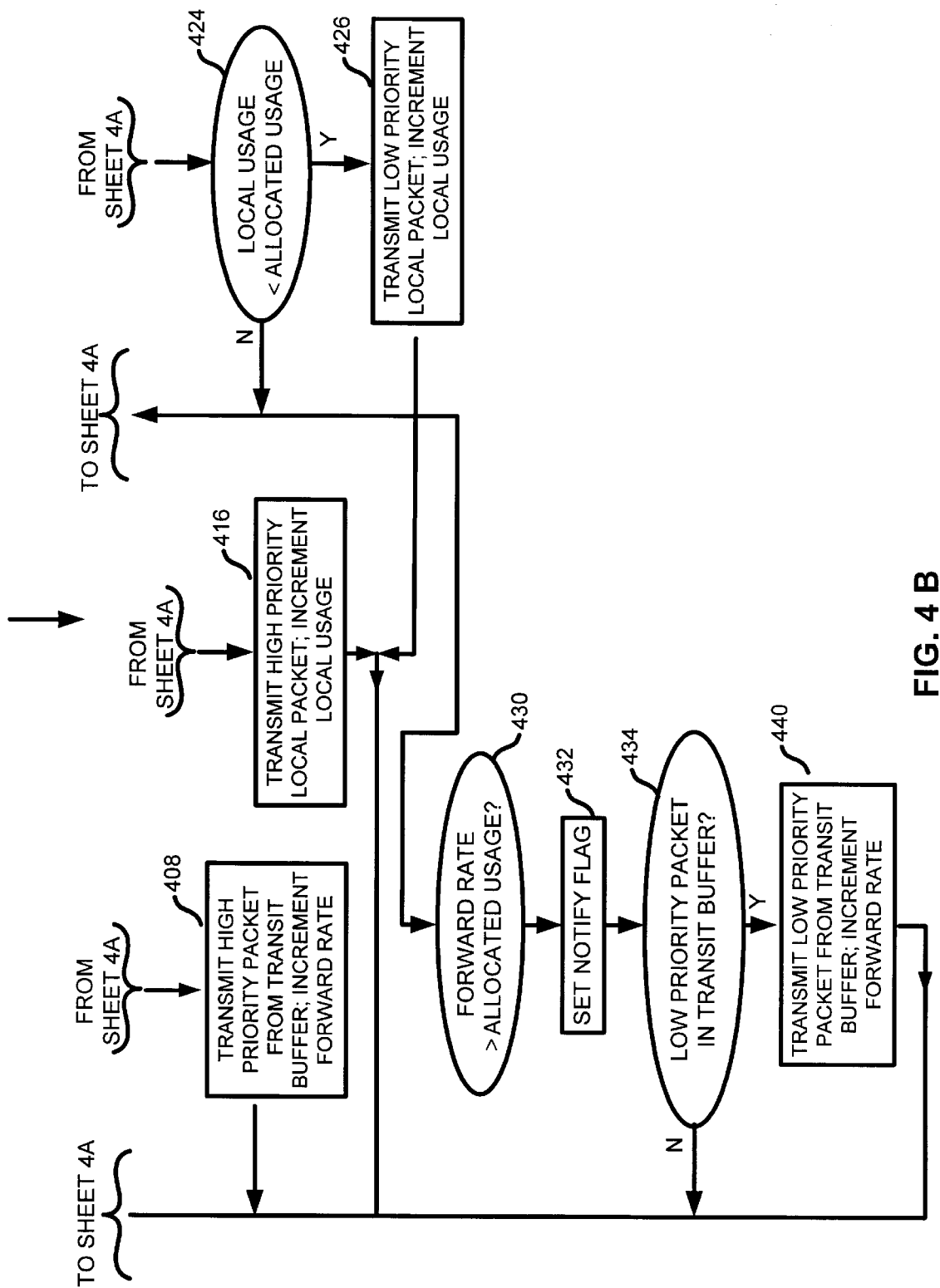

FIG. 4 is a process flow diagram illustrating a process implemented on each node for determining whether to transmit locally generated packets downstream on the network and whether to transmit downstream available bandwidth information upstream. The process starts at 400. In a step 402 the node determines whether or not the transit buffer has a high priority packet in it. If it does, then control is transferred to a step 404 where the node determines whether or not its forward rate is greater than its allocated usage. If the forward rate is greater than its allocated usage, then control is transferred to a step 406 and a flag is set indicating that a notification of downstream available bandwidth should be forwarded upstream. As described above, when upstream packets are sent, downstream available bandwidth is then included with the packets in the packet header. The time that the flag remains set may be adjusted to tune performance.

Once step 406 is executed, or if the forward rate is less than or equal to the allocated usage, control is transferred to a step 408. In step 408, the high priority packet is forwarded from the transit buffer to the next downstream node.

If the transit buffer does not have a high priority packet, then control is transferred to a step 412 and it is determined whether or not the local transmission buffer has a high priority packet. If the local transmission buffer has a high priority packet then control is transferred to a step 414. In step 414, the node checks whether or not the amount of data in the transit buffer is less than the high priority threshold. If the transit buffer threshold for high priority packets has not been reached, then control is transferred to a step 416. The high priority packet is transmitted on the output link and local transmit usage is incremented. Control is then transferred back to start and the process is repeated.

If, in step 412, it is determined that the transmission buffer does not have a high priority packet, then control is transferred to a step 420. In step 420, it is determined whether or not the transmission buffer has any low priority packets in it. If the transmission buffer has a low priority packet, then control is transferred to a step 422. In step 422, the transit buffer is checked to determine whether or not the amount of information in the transit buffer is less than the threshold for low priority transmission by the node. If the transit buffer is below the low priority transmission threshold, then control is transferred to a step 424 where it is determined whether or not local transmit usage exceeds allocated usage. If local transmit usage does not exceed allocated usage, then control is transferred to a step 426 and the low priority locally generated packet is transmitted onto the ring network. Control is then transferred back to start and the process is repeated.

Thus, the decision to send packets from the transit buffer or the transmission buffer is made based on whether local transmit usage exceeds allocated usage and on whether the transit buffer is full. In addition, high priority packets in the transit buffer are always transmitted immediately and high priority packets in the transmission buffer are transmitted regardless of whether local transmit usage exceeds allocated usage. Locally generated high priority packets also have a higher transit buffer threshold than low priority packets. In the embodiment described, high priority packets sent cause local transmit usage to be incremented so that even though an exception is made from the allocated usage, overall fairness is maintained. In most embodiments, however, it is preferred that high priority packets do not increment local transmit usage.

If it is determined in step 420 that the transmission buffer contains no low priority packets, or if it is determined in step 422 that the transit buffer depth exceeds the low priority local transmission threshold, or if it is determined in step 424 that the local transmit usage exceeds the allocated usage for the node, or if it is determined in step 424 that the transit buffer depth is exceeds the high priority threshold, then control is transferred to a step 430. In step 430, the node checks whether or not the forward rate exceeds the allocated usage for the node. If the forward rate exceeds the allocated usage, then a flag indicating that notifications should be sent in the upstream direction is set in a step 432. Whether or not the flag is set, control is transferred to a step 434 where it is determined whether or not the transit buffer contains any low priority packets. If the transit buffer contains a packet, the packet is sent in a step 440. Once the packet, if any, is sent, control is transferred back to start and the process is repeated.

Thus, the process described in FIG. 4 shows how the node is continually checking the transit buffer and the transmission buffer for packets. High priority packets in the transit buffer are immediately sent, if there are any. High priority packets in the transmission buffer are forwarded whenever the transit buffer depth is less than the high priority threshold. Local transmit usage is compared to allocated usage to determine whether low priority packets in the transmission buffer should be sent or whether low priority packets from the transit buffer should be forwarded. Low priority packets from the transmission buffer are transmitted onto the network only if the transit buffer depth is less than the low priority local transmission threshold. Low priority packets from the transit buffer are forwarded whenever other packets are not being transmitted.

Whenever a packet is forwarded, the forward rate is incremented and whenever a locally generated packet is transmitted onto the network, local transmit usage is incremented. Whenever it is determined that the forward rate is greater than the allocated usage, a flag is set indicating that a downstream bandwidth notification should be sent. The downstream available bandwidth used in the notification is the minimum of any received bandwidth and the local transmit usage.

Thus, the node regulates the amount of it own traffic that it transmits on the network according to its allocated usage and the node sends information upstream indicating downstream available bandwidth when local transmit usage is less than allocated usage.

Figure 5:
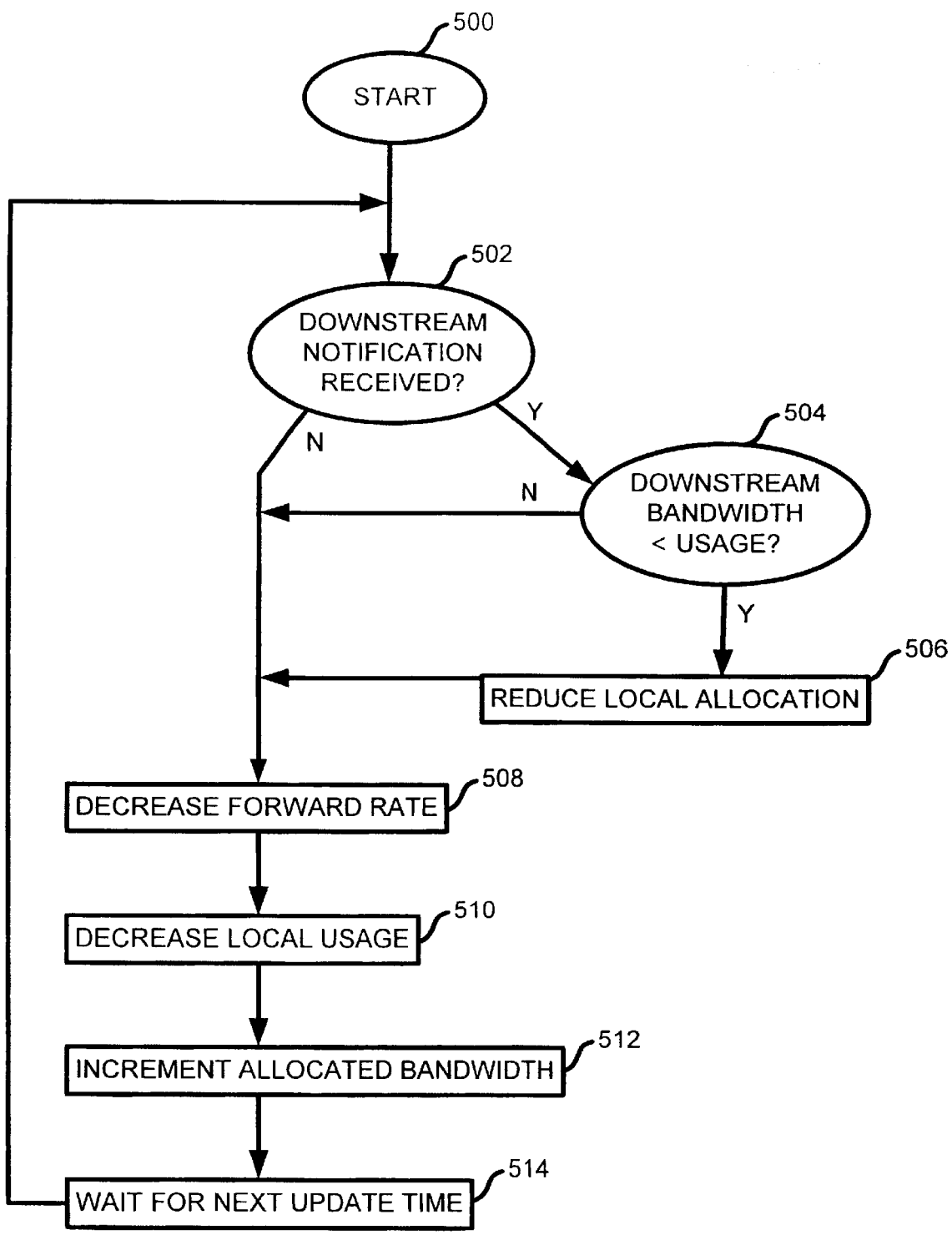
FIG. 5 is a process flow diagram illustrating a process for updating forward rate, local transmit usage, and allocated bandwidth.

FIG. 5 is a process flow diagram illustrating a process for updating forward rate, local transmit usage, and allocated bandwidth. The process starts at 500. In a step 502, it is determined whether a downstream notification has been received within a set period. If a notification was received, then control is transferred to a step 504 and it is determined whether downstream bandwidth is less than local transmit usage. If it is, then the local allocation is reduced in a step 506. Control is then transferred to a step 508 and the forward rate is decreased. Next, local transmit usage is decreased in a step 510 and allocated bandwidth is incremented in a step 512. The system then pauses until the next update time in a step 514 before control is transferred back to start and the process is repeated.

Figure 6:
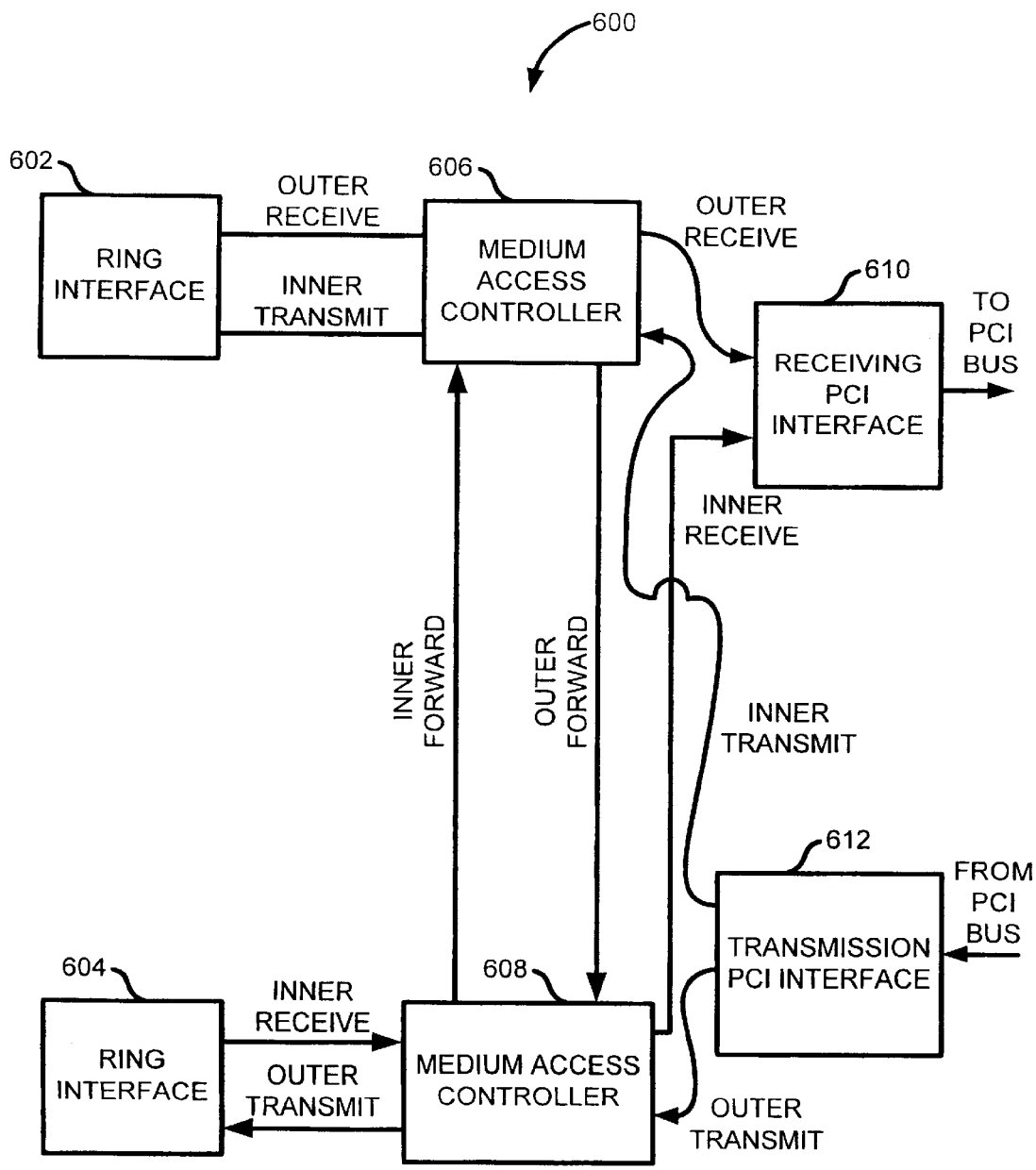
FIG. 6 is a block diagram illustrating an interface on a node that transfers data to and from a PCI bus used by the node for internal data routing.

FIG. 6 is a block diagram illustrating an interface on a node that transfers data to and from a PCI bus used by the node for internal data routing. A bi-directional ring interface 600 includes a pair of ring interfaces 602 and 604 provide access to a bi-directional ring such as the one depicted in FIG. 2. Bi-directional ring interface 600 also includes a pair of medium access controllers 606 and 608. Ring interface 602 receives packets from the outer ring and transmits packets to the inner ring. Ring interface 604 receives packets from the inner ring and transmits packets to the outer ring. Packets received by ring interface 602 from the outer ring are processed by medium access controller 606. Packets that are to be forwarded to the outer ring are sent to medium access controller 608 which transmits them to the outer ring via ring interface 604.

Medium access controller 606 and medium access controller 608 both forward packets for the node to a receiving PCI interface 610 which transfers data to the PCI bus. Medium access controller 606 and 608 receive packets from the PCI bus to be transmitted on the inner and outer rings via transmission PCI interfaces 610 and 612. Thus, the medium access controller receive packets for the node and forwards packets on ring interfaces 602 and 604.

A system and method for distributed bandwidth allocation for a bi-directional ring network has been disclosed. The manner of bandwidth allocation enables the bi-directional ring network to have both spatial and local reuse. Bandwidth is not allocated a priori to nodes on the network. Rather, bandwidth is statistically determined based on the usage of the network by the various nodes.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, certain aspects of the invention may be implemented on a unidirectional ring network. Accordingly, the present embodiments are to be considered as illustrative and not restrictive, and the invention is not to be limited to the details given herein, but may be modified within the scope and equivalents of the appended claims.

What is claimed is:

1. A method of locally determining a fair allocated bandwidth for a network node configured to send and receive packets in an upstream direction and a downstream direction comprising:

allocating a local allocated bandwidth for locally generated network packets sent in the downstream direction;

determining from information received in the upstream direction a minimum downstream available network bandwidth;

adjusting the local allocated bandwidth based on the minimum downstream available network bandwidth and periodically increasing the local allocated bandwidth toward a maximum local allocated bandwidth; and using the local allocated bandwidth to govern whether a class of locally generated network packets are sent in the downstream direction.

2. A method of locally determining a fair allocated bandwidth for a network node as recited in claim 1 wherein periodically increasing the local allocated bandwidth toward a maximum local allocated bandwidth further includes:

periodically adding a fraction of the difference between the local allocated bandwidth and the maximum local allocated bandwidth to the local allocated bandwidth.

3. A method of locally determining a fair allocated bandwidth for a network node as recited in claim 1 wherein adjusting the locally allocated bandwidth based on the minimum downstream available network bandwidth further includes:

reducing the local allocated bandwidth when the local allocated bandwidth is greater than the minimum downstream available network bandwidth.

4. A method of locally determining a fair allocated bandwidth for a network node as recited in claim 1 wherein adjusting the locally allocated bandwidth based on the minimum downstream available network bandwidth further includes:

reducing the local allocated bandwidth to the average of the local allocated bandwidth and the minimum downstream available network bandwidth when the local allocated bandwidth is greater than the minimum downstream available network bandwidths.

5. A method of locally determining a fair allocated bandwidth for a network node as recited in claim 1 wherein adjusting the locally allocated bandwidth based on the minimum downstream available network bandwidth further includes:

increasing the local allocated bandwidth asymptotically toward a maximum local allocated bandwidth when the local allocated bandwidth is less than the minimum downstream available network bandwidth.

6. A method of locally determining a fair allocated bandwidth for a network node as recited in claim 1 wherein adjusting the locally allocated bandwidth based on the minimum downstream available network bandwidth further includes:

increasing the local allocated bandwidth asymptotically toward the minimum downstream available network bandwidth when the local allocated bandwidth is less than the minimum downstream available network bandwidth.

7. A method of locally determining a fair allocated bandwidth for a network node as recited in claim 1 wherein using the local allocated bandwidth to govern whether locally generated network packets are sent in the downstream direction further includes:
   determining a local network usage in the downstream direction;
   comparing the local network usage in the downstream direction to the local allocated bandwidth; and
   preventing the sending of a class of locally generated network packets in the downstream direction if the local network usage in the downstream direction exceeds the local allocated bandwidth.

8. A method of locally determining a fair allocated bandwidth for a network node as recited in claim 7 wherein the class of locally generated network packets includes low priority packets.

9. A method of locally determining a fair allocated bandwidth for a network node as recited in claim 7 wherein high priority packets are sent in the downstream direction even when the local network usage in the downstream direction exceeds the local allocated bandwidth.

10. A method of locally determining a fair allocated bandwidth for a network node as recited in claim 7 wherein determining a local network usage in the downstream direction further includes:
   creating a locally generated traffic count by accumulating the number of bytes in locally generated network packets that are sent in the downstream direction; and
   periodically reducing the locally generated traffic count.

11. A method of locally determining a fair allocated bandwidth for a network node as recited in claim 10 wherein periodically reducing the locally generated traffic count includes:
   periodically subtracting a fraction of the locally generated traffic count from the locally generated traffic count.

12. A method of locally determining a fair allocated bandwidth for a network node as recited in claim 1 further including:
   determining a local network usage in the downstream direction;
   determining an amount of forwarded network traffic in the downstream direction;
   comparing the local network usage in the downstream direction to the amount of forwarded network traffic in the downstream direction; and
   preventing the sending of minimum downstream available network bandwidth information in the upstream direction if the local network usage in the downstream direction exceeds the amount of forwarded network traffic in the downstream direction.

13. A method of locally determining a fair allocated bandwidth for a network node as recited in claim 12 wherein determining a local network usage in the downstream direction further includes:
   creating a locally generated traffic count by accumulating the number of bytes in locally generated network packets that are sent in the downstream direction; and
   periodically reducing the locally generated traffic count.

14. A method of locally determining a fair allocated bandwidth for a network node as recited in claim 13 wherein periodically reducing the locally generated traffic count includes:
   periodically subtracting a fraction of the locally generated traffic count from the locally generated traffic count.

15. A method of locally determining a fair allocated bandwidth for a network node as recited in claim 12 wherein an amount of forwarded network traffic in the downstream direction further includes:
   creating downstream forwarded network traffic count by accumulating the number of bytes in downstream forwarded network packets that are sent in the downstream direction; and
   periodically reducing the downstream forwarded network traffic count.

16. A method of locally determining a fair allocated bandwidth for a network node as recited in claim 15 wherein periodically reducing the downstream forwarded network traffic count includes periodically subtracting a fraction of the downstream forwarded network traffic count from the downstream forwarded network traffic count.

17. A method of locally determining a fair allocated bandwidth for a network node as recited in claim 1 further including:
   sending minimum downstream available network bandwidth information in the upstream direction if the local network usage in the downstream direction is less than the amount of forwarded network traffic in the downstream direction.

18. A method of locally determining a fair allocated bandwidth for a network node as recited in claim 17 wherein the minimum downstream available network bandwidth information is determined by taking the lesser of the local network usage in the downstream direction and the minimum downstream available network bandwidth.

19. A method of locally determining a fair allocated bandwidth for a network node as recited in claim 18 wherein the minimum downstream available network bandwidth information is determined by taking the lessor of the local network usage in the downstream direction and the minimum downstream available network bandwidth plus a small constant.

20. A method of locally determining a fair allocated bandwidth for a network node as recited in claim 1 wherein the network node is a network node in a bi-directional ring network.

21. A method of locally determining a fair allocated bandwidth for a network node as recited in claim 1 wherein the network node is a network node in a linear network.

22. A statistically multiplexed network node with fairly allocated bandwidth comprising:
   a network interface configured to send and receive packets in an upstream direction and a downstream direction; and
   a packet controller configured to allocate a bandwidth for locally generated network packets sent in the downstream direction wherein the packet controller determines a minimum downstream available network bandwidth available in the downstream direction from information received in the upstream direction and adjusts the local allocated bandwidth based on the minimum downstream available network bandwidth, periodically increasing the local allocated bandwidth toward a maximum local allocated bandwidth and wherein the packet controller uses the local allocated bandwidth to govern whether a class of locally generated network packets are sent in the downstream direction.

23. A method of statistically multiplexing network use by nodes in a bi-directional ring network having an upstream direction and a downstream direction comprising:

determining at each node a local allocated bandwidth for locally generated network packets sent in the downstream direction;

sending downstream available network bandwidth information from each node in the upstream direction;

adjusting the local allocated bandwidth at each node based on the minimum downstream available network bandwidth information received at each node and periodically increasing the local allocated bandwidth toward a maximum local allocated bandwidth; and using the local allocated bandwidth at each node to govern whether a class of locally generated network packets are sent in the downstream direction.

24. A method of locally determining a fair allocated bandwidth for a network node of a unidirectional ring network wherein the network node is configured to send packets in a downstream direction and to receive packets from an upstream direction, comprising:

forwarding traffic received from the upstream direction to the downstream direction;

determining a local allocated bandwidth for locally generated network packets sent in the downstream direction based on a notification received from the upstream direction;

combining local usage with information from the notification received from the upstream direction to generate a downstream notification;

sending the downstream notification in the downstream direction;

determining local usage of the network; and restricting local usage based on the notification received from the upstream direction.

25. The statistically multiplexed network node as recited in claim 22 wherein periodically increasing the local allocated bandwidth toward a maximum local allocated bandwidth further includes:

periodically adding a fraction of the difference between the local allocated bandwidth and the maximum local allocated bandwidth to the local allocated bandwidth.

26. The statistically multiplexed network node as recited in claim 22 wherein adjusting the locally allocated bandwidth based on the minimum downstream available network bandwidth further includes:

reducing the local allocated bandwidth when the local allocated bandwidth is greater than the minimum downstream available network bandwidth.

27. The statistically multiplexed network node as recited in claim 22 wherein adjusting the locally allocated bandwidth based on the minimum downstream available network bandwidth further includes:

reducing the local allocated bandwidth to the average of the local allocated bandwidth and the minimum downstream available network bandwidth when the local allocated bandwidth is greater than the minimum downstream available network bandwidth.

28. The statistically multiplexed network node as recited in claim 22 wherein adjusting the locally allocated bandwidth based on the minimum downstream available network bandwidth further includes:

increasing the local allocated bandwidth asymptotically toward a maximum local allocated bandwidth when the local allocated bandwidth is less than the minimum downstream available network bandwidth.

29. The statistically multiplexed network node as recited in claim 22 wherein adjusting the locally allocated bandwidth based on the minimum downstream available network bandwidth further includes:

increasing the local allocated bandwidth asymptotically toward the minimum downstream available network bandwidth when the local allocated bandwidth is less than the minimum downstream available network bandwidth.

30. The statistically multiplexed network node as recited in claim 22 wherein using the local allocated bandwidth to govern whether locally generated network packets are sent in the downstream direction further includes:

determining a local network usage in the downstream direction;

comparing the local network usage in the downstream direction to the local allocated bandwidth; and preventing the sending of a class of locally generated network packets in the downstream direction if the local network usage in the downstream direction exceeds the local allocated bandwidth.

31. A system of locally determining a fair allocated bandwidth for a network node configured to send and receive packets in an upstream direction and a downstream direction comprising:

means for allocating a local allocated bandwidth for locally generated network packets sent in the downstream direction;

means for determining from information received in the upstream direction a minimum downstream available network bandwidth;

means for adjusting the local allocated bandwidth based on the minimum downstream available network bandwidth and periodically increasing the local allocated bandwidth toward a maximum local allocated bandwidth; and means for using the local allocated bandwidth to govern whether a class of locally generated network packets are sent in the downstream direction.

32. A computer program product for locally determining a fair allocated bandwidth for a network node configured to send and receive packets in an upstream direction and a downstream direction, the computer program product being embodied in a computer readable medium and comprising computer instructions for:

allocating a local allocated bandwidth for locally generated network packets sent in the downstream direction;

determining from information received in the upstream direction a minimum downstream available network bandwidth;

adjusting the local allocated bandwidth based on the minimum downstream available network bandwidth and periodically increasing the local allocated bandwidth toward a maximum local allocated bandwidth; and using the local allocated bandwidth to govern whether a class of locally generated network packets are sent in the downstream direction.

* * * * *